(12) United States Patent
     Box

(10) Patent No.: US 12,695,807 B2
(45) Date of Patent: *Jul. 28, 2026

(54) SYSTEM AND METHOD FOR APPLICATION TRAFFIC CONTROL

(71) Applicant: rewardStyle, Inc., Dallas, TX (US)

(72) Inventor: Baxter Box, Dallas, TX (US)

(73) Assignee: rewardStyle, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,513

(22) Filed: Nov. 6, 2024

(65) Prior Publication Data

US 2025/0063102 A1 Feb. 20, 2025

Related U.S. Application Data

(63) Continuation of application No. 18/625,589, filed on Apr. 3, 2024, now Pat. No. 12,166,833, which is a
(Continued)

(51) Int. Cl.
     *H04L 67/50* (2022.01)
     *G06F 3/0482* (2013.01)
     *G06F 16/2457* (2019.01)
     *G06F 16/957* (2019.01)
     *H04L 43/045* (2022.01)
     *H04L 43/062* (2022.01)
     (Continued)

(52) U.S. Cl.
     CPC .......... *H04L 67/306* (2013.01); *G06F 3/0482* (2013.01); *G06F 16/24573* (2019.01); *H04L 43/045* (2013.01); *H04L 43/062* (2013.01);

*H04L 67/535* (2022.05); *G06F 16/9577* (2019.01); *H04L 45/306* (2013.01)

(58) Field of Classification Search
     CPC ............. G06F 3/0482; G06F 16/24573; G06F 16/9577; H04L 29/08; H04L 43/045; H04L 43/062; H04L 45/306; H04L 67/22; H04L 67/306
     See application file for complete search history.

(56) References Cited

U.S. PATENT DOCUMENTS 6,029,141 A 2/2000 Bezos et al.
6,253,334 B1 6/2001 Amdahl et al.
(Continued)

FOREIGN PATENT DOCUMENTS

EP 2831753 B1 10/2018

*Primary Examiner* — Kostas J Katsikis
(74) *Attorney, Agent, or Firm* — Bookoff McAndrews, PLLC

(57) ABSTRACT

A system for managing web traffic comprising a meta control operating on a first processor having a first control interface and configured to generate a request for content and to transmit the request for content over a digital data network to a meta control server. The meta control server operating on a second processor and configured to receive the request for content and to select data for one or more second control interfaces as a function of data associated with the first control interface and to transmit the data for the one or more second control interfaces over the digital data network to the first control interface. The first control interface displays the data for the one or more second control interfaces and monitors user activity associated with the data.

20 Claims, 2 Drawing Sheets

100

Related U.S. Application Data continuation of application No. 18/461,828, filed on Sep. 6, 2023, now Pat. No. 11,979,469, which is a continuation of application No. 17/983,916, filed on Nov. 9, 2022, now Pat. No. 11,785,108, which is a continuation of application No. 17/688,504, filed on Mar. 7, 2022, now Pat. No. 11,528,335, which is a continuation of application No. 15/842,026, filed on Dec. 14, 2017, now Pat. No. 11,303,714.

(60) Provisional application No. 62/434,317, filed on Dec. 14, 2016.

(51) Int. Cl.
*H04L 45/302* (2022.01)
*H04L 65/40* (2022.01)
*H04L 67/306* (2022.01)

(56) References Cited

U.S. PATENT DOCUMENTS

| | | | |
|---|---|---|---|
| 7,765,209 B1 * | 7/2010 | Khesin | H04L 63/14 707/711 |
| 8,117,195 B1 * | 2/2012 | Dave | G06F 16/951 707/726 |
| 8,244,720 B2 * | 8/2012 | Bihun | G06F 16/9538 707/723 |
| 8,312,015 B1 | 11/2012 | Trevelyan | |
| 8,635,212 B1 | 1/2014 | Bunn et al. | |
| 8,788,492 B2 * | 7/2014 | Lu | G06F 16/24573 709/225 |
| 8,954,440 B1 | 2/2015 | Gattani et al. | |
| 8,972,412 B1 | 3/2015 | Christian et al. | |
| 9,411,856 B1 | 8/2016 | Stevens | |
| 9,495,693 B2 | 11/2016 | Box et al. | |
| 9,569,432 B1 | 2/2017 | Marra et al. | |
| 9,779,425 B2 | 10/2017 | Stoliartchouk et al. | |
| 9,875,488 B2 | 1/2018 | Box et al. | |
| 10,185,780 B1 | 1/2019 | Moody et al. | |
| 11,265,685 B1 | 3/2022 | Frolovichev et al. | |
| 2003/0110293 A1 | 6/2003 | Friedman et al. | |
| 2003/0167212 A1 | 9/2003 | Monteverde | |
| 2004/0026761 A1 | 2/2004 | Leonardi et al. | |
| 2004/0044565 A1 | 3/2004 | Kumar et al. | |
| 2004/0059779 A1 | 3/2004 | Philyaw | |
| 2004/0267610 A1 | 12/2004 | Gossett et al. | |
| 2005/0256866 A1 | 11/2005 | Lu et al. | |
| 2006/0004799 A1 | 1/2006 | Wallender | |
| 2006/0282336 A1 | 12/2006 | Huang et al. | |
| 2007/0061297 A1 | 3/2007 | Bihun et al. | |
| 2008/0010142 A1 | 1/2008 | O'Brien et al. | |
| 2008/0104113 A1 | 5/2008 | Wong et al. | |
| 2008/0104128 A1 | 5/2008 | Drayer et al. | |
| 2008/0162699 A1 | 7/2008 | Gaffney | |
| 2008/0201643 A1 | 8/2008 | Nagaitis et al. | |
| 2009/0006294 A1 | 1/2009 | Liu et al. | |
| 2009/0019153 A1 | 1/2009 | Sebastian | |
| 2009/0070366 A1 | 3/2009 | Zhao et al. | |
| 2009/0185486 A1 | 7/2009 | Gerber et al. | |
| 2010/0030544 A1 | 2/2010 | Gopalan et al. | |
| 2010/0058160 A1 | 3/2010 | Navarro et al. | |
| 2010/0070484 A1 | 3/2010 | Kraft et al. | |
| 2010/0070876 A1 | 3/2010 | Jain et al. | |
| 2010/0121842 A1 | 5/2010 | Klinkott | |
| 2010/0239157 A1 | 9/2010 | O'Dell et al. | |
| 2010/0287152 A1 | 11/2010 | Hauser | |
| 2010/0293157 A1 | 11/2010 | Ito | |
| 2011/0314007 A1 | 12/2011 | Dassa et al. | |
| 2012/0066211 A1 | 3/2012 | Gandhi | |
| 2012/0089617 A1 | 4/2012 | Frey | |
| 2012/0290522 A1 | 11/2012 | Dolan et al. | |
| 2012/0311431 A1 | 12/2012 | Breaker et al. | |
| 2012/0317269 A1 | 12/2012 | Weppler et al. | |
| 2012/0330938 A1 | 12/2012 | Lee et al. | |
| 2013/0054371 A1 | 2/2013 | Mason et al. | |
| 2013/0144729 A1 | 6/2013 | Jones et al. | |
| 2013/0185143 A1 | 7/2013 | Damman et al. | |
| 2013/0262971 A1 | 10/2013 | Stoliartchouk et al. | |
| 2013/0332440 A1 | 12/2013 | Barad et al. | |
| 2014/0108388 A1 | 4/2014 | Ma et al. | |
| 2014/0331328 A1 | 11/2014 | Wang et al. | |
| 2015/0012449 A1 | 1/2015 | Jackson et al. | |
| 2015/0120661 A1 | 4/2015 | Keebler et al. | |
| 2015/0154298 A1 | 6/2015 | Haig et al. | |
| 2015/0172299 A1 | 6/2015 | Khesin et al. | |
| 2016/0034595 A1 | 2/2016 | Gu et al. | |
| 2016/0086280 A1 | 3/2016 | Okiyama et al. | |
| 2016/0110358 A1 | 4/2016 | Lee et al. | |
| 2016/0189153 A1 | 6/2016 | Luk et al. | |
| 2016/0205109 A1 | 7/2016 | Kohli et al. | |
| 2016/0224560 A1 * | 8/2016 | Hartman | G06Q 30/0201 |
| 2016/0308706 A1 * | 10/2016 | Fu | H04L 67/10 |
| 2017/0068992 A1 | 3/2017 | Chen et al. | |
| 2017/0091968 A1 | 3/2017 | George et al. | |
| 2017/0351779 A1 | 12/2017 | Tarasov et al. | |
| 2018/0046637 A1 | 2/2018 | Koopman et al. | |
| 2018/0246983 A1 | 8/2018 | Rathod | |
| 2022/0163960 A1 | 5/2022 | Cella et al. | |

* cited by examiner

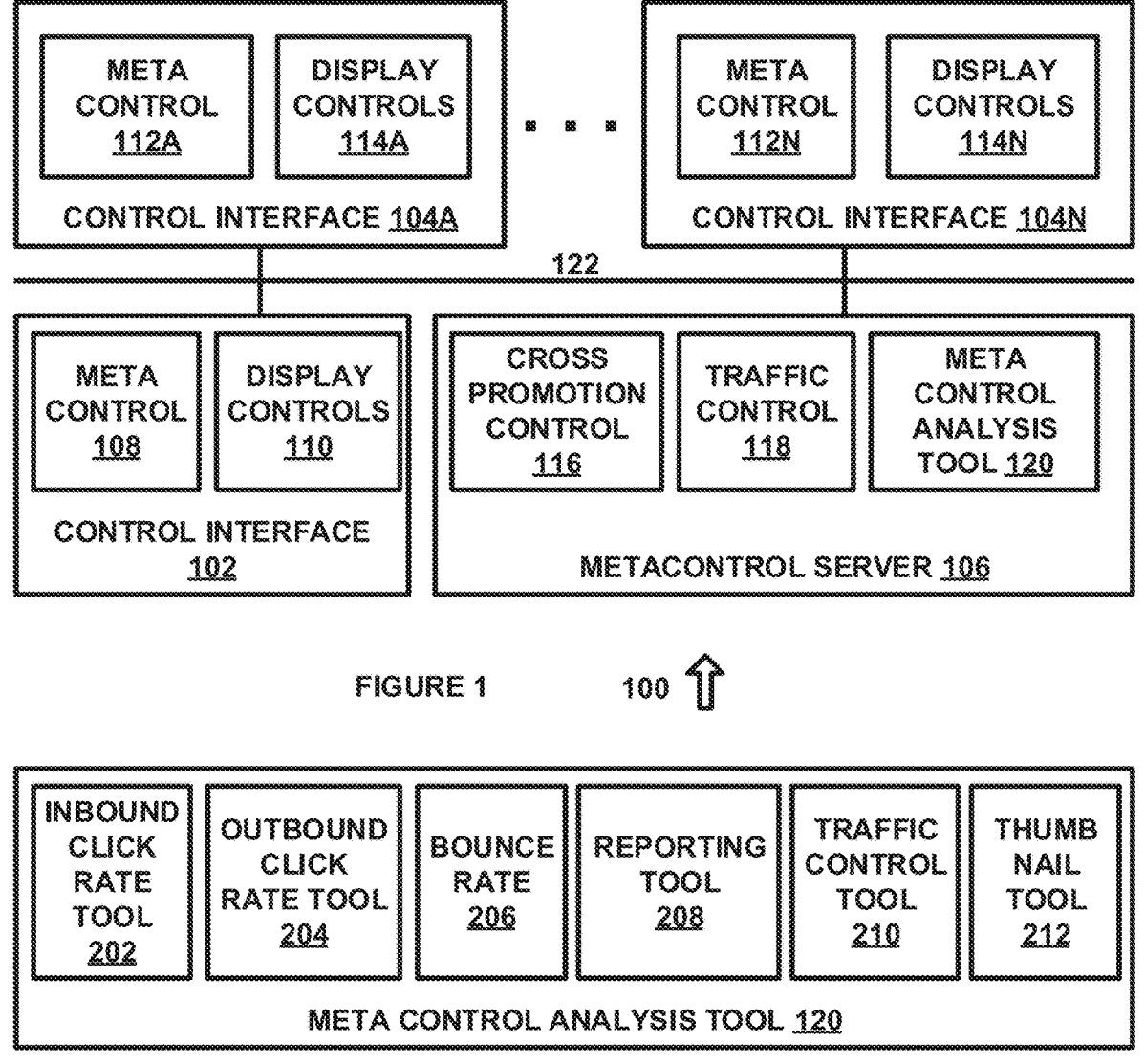
FIGURE 1        100 ⬆
FIGURE 2        200 ⬆

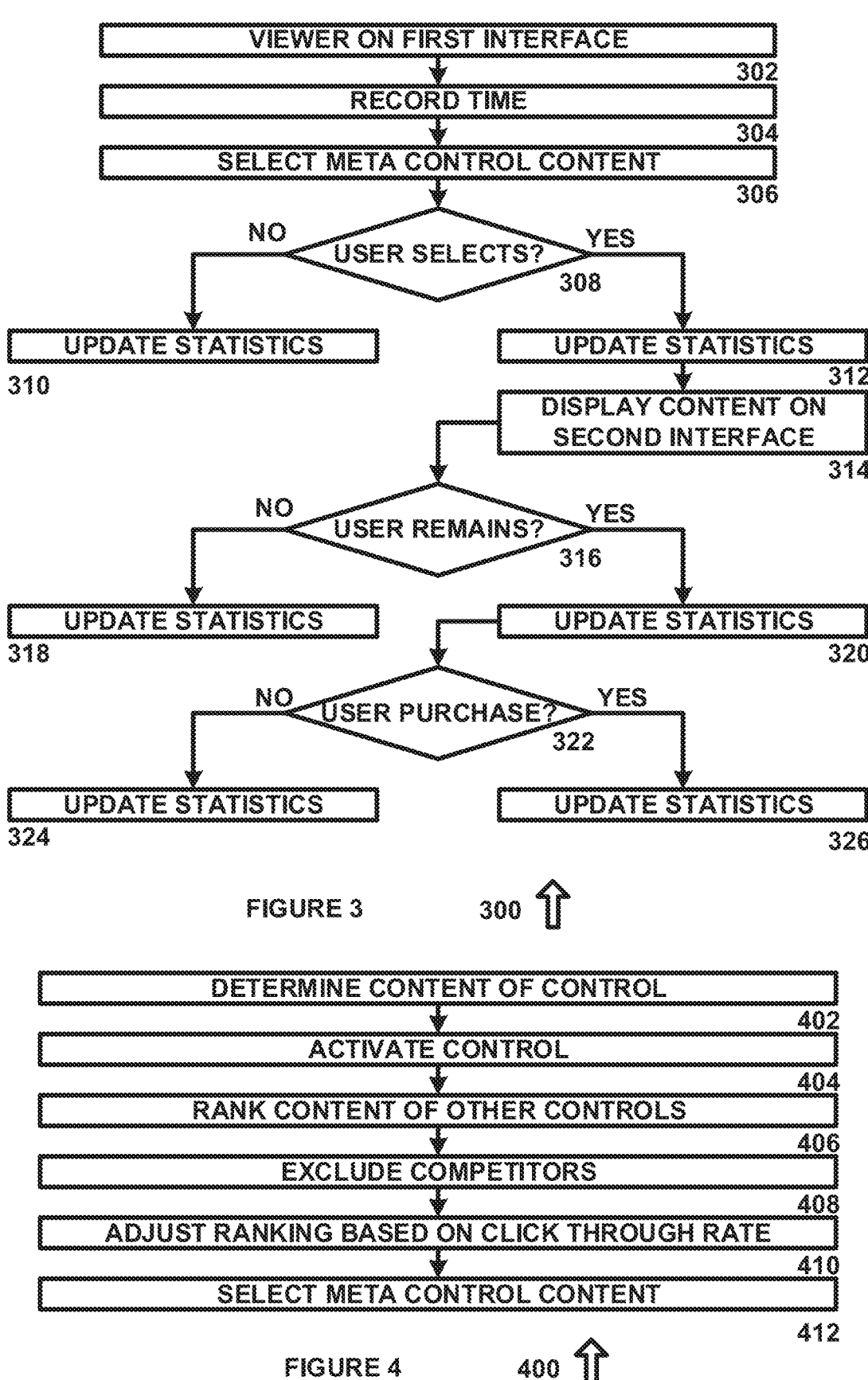
FIGURE 3      300
FIGURE 4      400

SYSTEM AND METHOD FOR APPLICATION TRAFFIC CONTROL

RELATED APPLICATIONS

This application is a continuation of U.S. application Ser. No. 18/625,589, filed on Apr. 3, 2024, which is a continuation of U.S. application Ser. No. 18/461,828, filed on Sep. 6, 2023, now U.S. Pat. No. 11,979,469, which is a continuation of U.S. application Ser. No. 17/983,916, filed on Nov. 9, 2022, now U.S. Pat. No. 11,785,108, which is a continuation of U.S. application Ser. No. 17/688,504, filed on Mar. 7, 2022, now U.S. Pat. No. 11,528,335, which is a continuation of U.S. application Ser. No. 15/842,026, filed on Dec. 14, 2017, now U.S. Pat. No. 11,303,714, which claims the benefit of priority to U.S. Provisional Application No. 62/434,317, filed on Dec. 14, 2016, all of which are incorporated herein by reference in their entireties.

TECHNICAL FIELD

The present disclosure relates generally to software applications, and more specifically to a system and method for controlling traffic between applications, such as when a viewing user is directed from a first application to a second application.

BACKGROUND OF THE INVENTION

Web based applications can direct viewing users to other web based applications and from other web based applications to the web based applications using hypertext transfer protocol (HTTP) or other procedures. Direction of viewing users thus creates traffic between the web based applications. However, there is very little control over such traffic, as a viewing user of a primary web based application can then navigate to other web based applications after they have left the primary web based application and the viewing user of the secondary web based applications can navigate to the primary web based application and can view the content of the web based applications therein without any control of the traffic directed there between.

SUMMARY OF THE INVENTION

One of the goals of a web traffic management system includes using a meta control operationally functional with a primary web site and a meta control server to ensure that linkable data integrated with the primary web site and provided from secondary web sites only includes linkable data from secondary web sites deemed as non-competing web sites and secondary web sites determined to be web sites that may not decrease traffic flow to the primary web site or the primary web site can assist in increasing traffic to the secondary web site.

In an aspect, the present disclosure is directed to a system for managing web traffic that includes a meta control, such as a widget, operating on a first processor having a first control interface, such as a blog, and configured to generate a request for content and to transmit the request for content over a digital data network to a meta control server. The meta control server receives the request for content and select data for one or more second control interfaces, such as other blogs, as a function of data associated with the first blog, and to transmit the data for the one or more second blogs to the first blog. The first blog displays the data for the one or more second blogs and monitors user activity associated with the data, such as a click through event by a viewing user.

The system also scrapes text and image data associated with the first control interface; determines a publisher of data for each of the second control interfaces; and selects data for one or more second control interface according to the determined publisher. The system also generates a list of prospective one or more second control interfaces to identify and rank the second control interfaces. The rank of the second control interfaces can be based on relevance of the data of one or more second control interfaces; on inbound clicks or outbound clicks; on relevance of the data and then based on either inbound clicks or outbound clicks; on relevance of the data and then based on outbound clicks and then based on inbound clicks; relevance of the data and then based on inbound clicks and then based on outbound clicks; on relevance of the data and then based on outbound clicks of the first control interface and then based on inbound click statistics of a second control interface; and on relevance of the data then based on inbound click statistics of the first control interface and then based on outbound click statistics of a second control interface.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a system for traffic management in accordance with an exemplary embodiment of the present disclosure;

FIG. 2 is a diagram of a system for meta control analysis in accordance with an exemplary embodiment of the present disclosure;

FIG. 3 is a diagram of an algorithm for updating click-through statistics, in accordance with an exemplary embodiment of the present disclosure; and FIG. 4 is a diagram of an algorithm for selecting secondary control interface content for a primary control interface, in accordance with an exemplary embodiment of the present disclosure.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

In the specification and drawings that follow, the methods and systems presented herein address issues associated with the management of website data and the integration thereof. As web based technologies evolve and as consumers expect more from web based services, service providers and merchants seek to find ways in which to provide the most effective enhanced services without compromising or negatively impacting the revenue based flow of traffic for the service provider and the merchant. In other words, a content provider wherein web based traffic is essential to their business seeks to provide content most relevant to their customer needs. However, if the integration of third party content into a primary content providers web site offering can negatively impact the primary content provider's business, obviously integration of that content would not be desirable. Therefore, a need for a web based mechanism to manage integration of third party web based content with a primary content provider exists.

FIG. 1 is a diagram of a system 100 for traffic management in accordance with an exemplary embodiment of the present disclosure. System 100 includes control interface 102, control interfaces 104A through 104N and meta control server 106, each of which can be implemented in hardware or a suitable combination of hardware and software.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Control interface 102 is a special purpose processor that is configured to generate a plurality of user controls that includes content by receiving user control definition data and generating associated user controls. In one exemplary embodiment, control interface 102 can be implemented as a World Wide Web (WWW) log or "blog" post that includes images and data as well as a plurality of user controls that can either be included in the blog post, such as hypertext links and widgets, or external to the blog post, such as web browser controls and user interface devices such as mouse controls, cursor controls and other suitable controls having the specific control data input and output processing functionality described in greater detail herein. In this exemplary embodiment, meta control 108 and display controls 110 can be implemented as hypertext links, widgets, external controls or in other suitable manners. In another exemplary embodiment, control interface 102 can be implemented as an application or thin client on a smart phone, tablet computer or other suitable computing device, that includes additional functional and display elements having the specific control data input and output processing functionality described in greater detail herein. In this exemplary embodiment, the application or thin client can be written in objective C, HTML, JavaScript or other suitable programming languages, and meta control 108 and display controls 110 can be implemented as an object, agent, control, function, user-selectable link or in other suitable manners having the specific control data input and output processing functionality described in greater detail herein.

Meta control 108 generates meta content that can include meta controls and meta data, and which is functionally associated with meta control server 106. In one exemplary embodiment, meta control 108 operates in conjunction with display controls 110, which are used to generate additional content and controls. In this exemplary embodiment, where control interface 102 is a blog operating on a website, display controls 110 are used to generate the blog content and functionality, such as the text data, image data, navigation controls (cursor scrolling and cursor arrow keys) and other suitable user controls, and meta control 108 is used to include additional content and controls that are provided by meta control server 106. It is the innovative control functionality of the special purpose control interface 102 and meta control 108 along with the meta control server 106 that provides the additional content and methods by which this is done provide significant technical advantage over traditional approaches as will become apparent. In this exemplary embodiment, the content and controls generated by meta control 108 are independent of the control of the developer of control interface 102, other than the decision to include or exclude meta control 108 within control interface 102, and can include thumbnails or other links to one or more of control interfaces 104A through 104N. As used herein, a thumbnail refers to a small window that includes content, such as an image, text or other suitable content, and which has an associated transfer control such as HTTP, so that when a viewing user selects the thumbnail with a user interface device such as a mouse or touch screen interface, the user can navigate to a control interface associated with the thumbnail. In addition or alternatively, limited control can be provided to the developer of control interface 102 to control the content and functionality of meta control 108, such as the location of meta control 108 within control interface 102, to generate feedback regarding the content generated by meta control 108 (such as to remove predetermined content) or for other suitable purposes. In another exemplary embodiment, control interface 102 can be an application, and the location and functionality of meta control 108 can be defined by the application developer, although additional functionality can also or alternatively be allocated to the developer/publisher of control interface 102. For example, in this exemplary embodiment control interface 102 can be a social media application, and meta control 108 and display controls 110 can be defined by the social media application in conjunction with the provider of meta control server 106, but the content of the publisher's social media page can be controlled by the publisher.

Meta control server 106 is a special purpose processor that is configured to functionally interface with meta control 108 to provide content and controls. In one exemplary embodiment, meta control server 106 can include cross promotion control 116 and traffic control 118, which are used to select content for meta control 108, and meta control analysis tool 120, which can generate reports for users of traffic generated by meta control 108 and meta control server 106. The meta control server 106, cross promotion control 116, and meta control analysis tool 120 can select and provide content and generate reports using the specific control data input and output processing functionality described in greater detail herein. In one exemplary embodiment, where control interface 102 is a blog operating on a website, meta control 108 can be included within a blog post by the developer of the blog, and can be activated when a viewing user accesses the blog post. In this exemplary embodiment, meta control 108 generates a data message when the control interface 102 is loaded into a viewer, web browser or otherwise activated, where the data message is transmitted by the processor and network infrastructure to meta control server 106. One of ordinary skill will recognize that the processor and network infrastructure in this embodiment is well known, and includes the Open System Interconnect (OSI) functionality that has been developed to provide Internet communications, including but not limited to WWW browser software that generates user interfaces and controls such as HTTP controls, processor functionality that includes display devices that generate user interface displays, buffers that store data for display, processors that recognize user interface controls and that format data for transmission over a network, network interface devices that provide the network interface functionality that allow devices to communicate over a data network by requesting and receiving data, tracking addresses and timing and other network interface functionality, and the like.

Meta control server 106 receives the data message that is generated at actuation by meta control 108 and selects data for transmission to meta control 108 to be generated in conjunction with control interface 102. In one exemplary embodiment, the data can include text, image and control data selected by cross promotion control 116 and traffic control 118 that is associated with control interfaces 104A through 104N, where the data is selected based on data associated with control interface 102, such as by the publisher of each control interface 104A through 104N when each publisher installs meta control 112A through 112N on the associated control interface 104A through 104N, respectively. In one exemplary embodiment, where control interface 102 is a blog post, meta control server 106 can first identify relevant data associated with the blog post, such as by "scraping" the text and image data included in the blog post, and can then use that text and image data to select data associated with one or more of control interfaces 104A through 104N for inclusion within control interface 102. In this exemplary embodiment, the blog post of control interface 102 can be directed to clothing that is appropriate for an event, where the clothing is available from a first retailer. Meta control server 106 can "scrape" the text and image data used by the publisher to create the blog post and can then use that text and image data to select other blog posts, such as one or more of control interfaces 104A through 104N, for inclusion within the publisher's blog post at a suitable location, such as in a thumbnail image located along the bottom or side margins of the blog post. The content provided in the thumbnail can be randomly selected, selected by the publisher of the other control interface, can be still or video images, or can be selected in other suitable manners. In this manner, a person that is viewing the publisher's blog post for the purpose of finding attire for an event that is discussed in the blog post can be presented with other useful options for attire, but can be restricted to other retailers, so as not to compete with the original blog post. By analyzing the content of the original blog post and selecting content for inclusion that is 1) related and 2) non-competitive, meta control server 106 operates in conjunction with meta control 108 to benefit not only the publisher of control interface 102 but also the publishers of control interfaces 104A through 104N. By allowing selected content from control interfaces 104A through 104N to be included in control interface 102, the publisher of control interface 102 thus increases the appeal of their blog post while being included in the pool of related content that can be included in the blog posts of control interfaces 104A through 104N, which one of ordinary skill in the art will recognize provide the same functionality as described for control interface 102, but instead for the text and image data of those other control interfaces 104A through 104N.

It is the innovative input and output processing functionality of the special purpose meta control server 106 and meta control 108 that provides the additional content by filtering the content based on at least one of relevancy and non-competing content. It is this control functionality that provides significant technical advantage over traditional approaches to liking web based content.

In addition to cross promotion control 116, traffic control 118 can also be advantageously used to optimize the performance of system 100. In one exemplary embodiment, where control interfaces 102 and 104A through 104N are blog posts, the selection of the most relevant secondary blog post for inclusion within the primary blog post of control interface 102 can be based on image and text data, as described, but can result in a traffic imbalance. For example, control interface 102 can result in more outbound traffic than inbound traffic, such as where the viewers of control interface 102 are more likely to select one or more of control interfaces 104A through 104N ("outbound clicks") than the viewers of control interfaces 104A through 104N are likely to select control interface 102 ("inbound clicks"). A number of reasons can exist for such imbalances, but in order to ensure that all publisher users of system 100 enjoy the same benefits from the collective users of control interfaces 102 and 104A through 104N, traffic control 118 can be used to modify the ranking of the results when a user control 102 or 104A through 104N is loaded by a user. In this exemplary embodiment, where the user controls are associated with a blog, when a user accesses one of the participating blogs of system 100, meta control server 106 can first generate a list of prospective blog links using cross promotion control 116 to first identify and rank the most relevant associated blogs, and can then use traffic control 118 to select a blog for inclusion as a function of the "outbound clicks" for the current blog and the "inbound clicks" for that blog. For example, if the current blog has a large number of outbound clicks but a small number of inbound clicks, and the highest ranked associated blogs have large numbers for inbound clicks but low numbers for outbound clicks, traffic control 118 can be used to skip to the blog in the ranking that has a higher number of outbound clicks. For example, if blog A is currently being viewed on control interface 102, then cross promotion control 116 for meta control server 106 could identify the following blogs for inclusion based on ranking of content text and data, with the associated inbound and outbound click data:

| Blog | Inbound clicks | Outbound clicks |
|---|---|---|
| B | 100 | 1 |
| C | 10 | 10 |
| D | 1 | 100 |

If blog A has a large number of inbound clicks but a small number of outbound clicks, then blog B might be selected for inclusion in a thumbnail of the meta control for blog A, because it is less likely to lead the viewing user away from blog A. In other words, the viewing user would possibly select a control to navigate to blog B, but would be less likely to navigate away from blog B, and might therefore return to blog A. A new selection could then be made, which would increase the number of outbound clicks for blog A. Alternatively, if blog A has a small number of outbound clicks but a large number of inbound clicks, then blog D could be selected over blogs B and C, even though it is not as relevant as blogs B and C, in order to increase the number of inbound clicks for blog D.

Likewise, other suitable processes can also or alternatively be used to optimize traffic. For example, consider the following blogs for inclusion based on ranking of content text and data, with the associated inbound and outbound click data:

| Blog | Inbound clicks | Outbound clicks |
|---|---|---|
| B | 100 | 100 |
| C | 1 | 1 |
| D | 1 | 100 |

If blog A has a small number of inbound clicks and a small number of outbound clicks, then blog C might be selected over blog B for inclusion in the meta control for blog A, because it is less likely to lead the viewing user away from blog A. In other words, the viewing user would possibly select a control to navigate to blog C, but would be less likely to navigate away from blog C than blog B, and might therefore return to blog A. A new selection could then be made, which would increase the number of outbound clicks for blog A. Alternatively, if blog A has a large number of outbound clicks and a large number of inbound clicks, then blog D could be selected over blogs B and C, even though it is not as relevant as blogs B and C, in order to increase the number of inbound clicks for blog D and to further decrease the likelihood that the viewing user will return to blog A and obtain another outbound click for blog A.

As such, while the present disclosure is not limited to a specific algorithm for assigning thumb nails for other control interface data to the meta control for a specific interface, the following non-limiting examples of algorithms are contemplated as falling within the scope of the present disclosure:

1. Assigning control interfaces based strictly upon ranking relevance from text and image content.

2. Assigning control interfaces based strictly upon ranking outbound click statistics.

3. Assigning control interfaces based strictly upon ranking inbound click statistics.

4. Assigning control interfaces based upon ranking relevance from text and image content and then based on outbound click statistics.

5. Assigning control interfaces based upon ranking relevance from text and image content and then based on inbound click statistics.

6. Assigning control interfaces based upon ranking relevance from text and image content and then based on outbound click statistics and then based on inbound click statistics.

7. Assigning control interfaces based upon ranking relevance from text and image content and then based on inbound click statistics and then based on outbound click statistics.

8. Assigning control interfaces based upon ranking relevance from text and image content and then based on outbound click statistics of the primary control interface and then based on inbound click statistics of the secondary control interface, where the primary control interface if the control interface that is being accessed by the viewing user and the secondary control interface is the control interface that is being added to the primary control interface by the meta control.

9. Assigning control interfaces based upon ranking relevance from text and image content and then based on inbound click statistics of the primary control interface and then based on outbound click statistics of the secondary control interface.

10. Assigning control interfaces based upon ranking relevance from text and image content and then based on inbound click statistics of the primary control interface and then based on inbound click statistics of the secondary control interface.

11. Assigning control interfaces based upon ranking relevance from text and image content and then based on outbound click statistics of the primary control interface and then based on outbound click statistics of the secondary control interface 12. Assigning control interfaces based upon ranking relevance from text and image content and then based on inbound click statistics of the primary control interface and then based on outbound click statistics of the primary control interface and then based on inbound click statistics of the secondary control interface.

13. Assigning control interfaces based upon ranking relevance from text and image content and then based on outbound click statistics of the primary control interface and then based on inbound click statistics of the primary control interface and then based on outbound click statistics of the secondary control interface.

14. Assigning control interfaces based upon ranking relevance from text and image content and then based on outbound click statistics of the primary control interface and then based on inbound click statistics of the primary control interface and then based on outbound click statistics of the secondary control interface and then based on inbound click statistics of the secondary control interface.

15. Assigning control interfaces based upon ranking relevance from text and image content and then based on outbound click statistics of the primary control interface and then based on inbound click statistics of the primary control interface and then based on inbound click statistics of the secondary control interface and then based on outbound click statistics of the secondary control interface.

16. Assigning control interfaces based upon ranking relevance from text and image content and then based on outbound click statistics of the primary control interface and then based on inbound click statistics of the secondary control interface and then based on inbound click statistics of the primary control interface and then based on outbound click statistics of the secondary control interface.

17. Assigning control interfaces based upon ranking relevance from text and image content and then based on inbound click statistics of the primary control interface and then based on outbound click statistics of the secondary control interface and then based on outbound click statistics of the primary control interface and then based on inbound click statistics of the secondary control interface.

Although exemplary algorithms for selecting secondary control interface content for a primary control interface in accordance with the exemplary embodiments of the present disclosure have been provided, one of ordinary skill in the art will recognize that other suitable algorithms can also or alternatively be used, using other factors such as demographics, user preferences, neural network-assisted selection processes, white lists, black lists or other suitable functions.

It is the innovative input and output processing functionality of the special purpose meta control server 106, meta control 108, cross promotion control 116, and traffic control 118 that provides the additional content and can further filter the content based on non-competing content and on at least one of relevancy, inbound clicks, and outbound clicks depending the preference or needs of a primary or secondary provider of web site data. It is this control functionality that provides significant technical advantage over traditional approaches to linking web based content.

Meta control analysis tool 120 tracks inbound click rates, outbound click rates and bounce rates (where a click through does not result in any substantial viewing of the secondary control interface), and provides reporting tools for publishers and system administrators to allow traffic to be analyzed and controlled. In one exemplary embodiment, meta control analysis tool 120 can generate a dash board control for the publisher that allows the published to see the inbound click rate and outbound click rate for traffic generates by meta control 108, to black list specific control interfaces displayed by meta control 108 (such as competitors), to adjust traffic, and to perform other suitable functions.

In addition to the exemplary embodiments discussed above with respect to blogs, other suitable user interfaces can also or alternatively be used, such as social networking (such as Facebook, Instagram, Snapchat, Twitter), email or text messaging functions or applications, video messaging functions or applications, screen shot processing applications or other suitable applications. In these other exemplary embodiments, the ability to provide cross promotion with other content and traffic control can be implemented in manners suitable for those applications, such as by providing thumbnails of the content at the bottom or side of the user interface, by inserting content at suitable locations in video data or sequences of still images, or in other suitable manners.

FIG. 2 is a diagram of a system 200 for meta control analysis in accordance with an exemplary embodiment of the present disclosure. System 200 includes meta control analysis tool 120 and inbound click rate tool 202, outbound click rate tool 204, bounce rate tool 206, reporting tool 208, traffic control tool 210 and thumb nail tool 212, each of which can be implemented in hardware or a suitable combination of hardware and software.

Inbound click rate tool 202 generates inbound click rate data for meta control 108, meta controls 112A through 112N and meta control server 106. In one exemplary embodiment, inbound click rate tool 202 can receive data that is generated when a viewing user selects an HTTP link or other suitable control to navigate from a primary control interface to a secondary control interface, where the selection is an inbound click for the secondary interface and an outbound click for the primary interface. The number of clicks is also related to the click through rate, which can be the number of times that the HTTP link is selected by the viewing user divided by the number of viewing impressions for a given HTTP link or other suitable metrics. Inbound click rate tool 202 can be used to generate inbound click rate data for a dashboard that is generated for a publisher of a primary control interface, a system administrator or other suitable users.

Outbound click rate tool 204 generates outbound click rate data for meta control 108, meta controls 112A through 112N and meta control server 106. As discussed above, there is a direct relationship between an inbound click and an outbound click, such that the same event that generates data for one can also be used to generate data for the other, but the data collection and reporting for each can be adapted as needed. In one exemplary embodiment, the inbound click rate data and the outbound click rate data can be stored for each control interface in a separate data record, and the inbound and outbound click rates can be generated from a data record for each control interface. In another exemplary embodiment, the user activity for every control interface can be centrally stored and inbound and outbound click rates can be generated from a central database for all control interfaces. Likewise, other suitable embodiments can also or alternatively be used.

Bounce rate tool 206 tracks the success or failure of a transfer from a primary control interface to a secondary control interface. In one exemplary embodiment, a "bounce" or failure can be defined based on whether the viewing user remains for a predetermined length of time spent on the secondary control interface, whether the viewing user performs a number of user interactions with HTTP links or other controls of the secondary interface, whether the viewing user performs a number of scroll events or other user interface control events, a suitable combination of such events or other suitable metrics.

Reporting tool 208 generates reports for publishers, administrators or other suitable users. In one exemplary embodiment, reporting tool 208 can include user-selectable reporting criteria for traffic to and from a control interface, a ranking of the control interfaces having the highest inbound click rates, a ranking of the control interfaces having the highest outbound click rates or other suitable data.

Traffic control tool 210 generates one or more user interface controls to allow a user to increase or decrease traffic to or from a control interface. In one exemplary embodiment, a publisher can have a high inbound traffic rate, and can elect to reduce that rate in exchange for an increase in inbound traffic at a different control interface, to receive a payment or for other suitable purposes. Likewise, a publisher can have a high outbound traffic rate, and can elect to offer spots in one or more meta control advertising spots to other publishers for a fee, such as by entering into an agreement with a publisher of a secondary control interface that is brokered through the administrator of a meta control server. Traffic control tool 210 allows a publisher to modify inbound or outbound traffic levels in such manners or in other suitable manners, either independently or in conjunction with an administrator of a meta control server, secondary control interface publisher or in other suitable manners.

Thumb nail tool 212 can be used to generate thumbnail content for a control interface. In one exemplary embodiment, thumb nail tool 212 can automatically select content based on the match between a primary control interface and a secondary control interface, such as by selecting text and images of the secondary control interface that are most similar to the text and images of the primary control interface (e.g. "scraping" content). In another exemplary embodiment, thumb nail tool 212 can generate a user interface to allow a publisher to create a thumb nail that will be used by meta controls to generate content on other control interfaces.

FIG. 3 is a diagram of an algorithm 300 for updating click-through statistics, in accordance with an exemplary embodiment of the present disclosure. Algorithm 300 can be implemented in hardware or a suitable combination of hardware and software.

Algorithm 300 begins at 302, where a viewer is executed using a first control interface. In one exemplary embodiment, a viewing user can navigate to a blog using a web browser, and can cause text data, image data and controls associated with the blog to load in a web browser application. The algorithm then proceeds to 304.

At 304, the time of access is recorded. In one exemplary embodiment, the time of access can be used to select additional content from other control interfaces, such as to select control interface content that is the most relevant. The algorithm then proceeds to 306.

At 306, meta control content is selected. In one exemplary embodiment, the meta control content can be selected using the previously disclosed exemplary embodiments, such as by extracting text and image data from a primary control interface and then by selecting secondary control interface content based on a ranking of similar relevant terms. In addition, other suitable data can also or alternatively be used, such as text and image data from one of more linked sources associated with the control interface, inbound or outbound click through data associated with the primary or secondary control interface, demographic data, white lists, black lists or other suitable data. The algorithm then proceeds to 308.

At 308, it is determined whether the user has selected a secondary control interface. In one exemplary embodiment, the secondary control interface data can be presented as thumbnails that are displayed along the bottom or side of the primary control interface. In another exemplary embodiment, the secondary control interface data can be inserted within the primary control interface data, such as based on an XML template, based on a location of one or more tags or in other suitable manners. Other suitable formats can also or alternatively be used. User selection of a thumbnail or other suitable selection control can be used to navigate to the selected control interface, to open a new window containing the control interface, to generate a pop-up window that can be further selected to navigate to the selected control interface, or in other suitable manners. If it is determined that a user did not select the secondary control interface at 308, such as by timing out, by detection of user navigation to a different web page or in other suitable manners, then the algorithm proceeds to 310 where statistics are updated, such as to reflect that the secondary control interface was loaded onto the web page (typically referred to as an "impression") but that the user did not "click through" by selecting the secondary control interface. If it is determined at 308 that the user selected the secondary control interface, the algorithm proceeds to 312, where click through statistics for the primary control interface and secondary control interface are updated, such as to reflect the outbound click from the primary control interface to the secondary control interface, the inbound click to the secondary control interface from the primary control interface, and other suitable data. The algorithm then proceeds to 314.

At 314, the content from the secondary user interface is generated. In one exemplary embodiment, the content can be generated in a new window of a web browser or other suitable application. In another exemplary embodiment, the content can be generated in the same window and can replace the content of the primary control interface, or other suitable processes can also or alternatively be used. The algorithm then proceeds to 316.

At 316, it is determined whether the user has remained on the secondary control interface for a predetermined period of time. In addition or alternatively, it can be determined if the user has scrolled on the secondary control interface, selected one or more controls on the secondary control interface or has otherwise interfaced with the secondary control interface in a manner that reflects that the user has viewed the content. If it is determined that the user has not remained on the secondary control interface for a predetermined period of time or otherwise viewed the secondary control interface, the algorithm proceeds to 318, where statistics are updated to reflect that the viewing user did not interact with the secondary control interface. Otherwise, the algorithm proceeds to 320.

At 320, statistics are updated to reflect that the user remained on the secondary control interface, such as to confirm a click through rate for inbound or outbound traffic statistics. The algorithm then proceeds to 322.

At 322, it is determined whether the user made a purchase from the secondary control interface or otherwise generated revenue, such as ordering content, making a donation or engaging in other revenue-based activities. In one exemplary embodiment, a meta control server can store state information and track activities associated with the user at the secondary control interface. In another exemplary embodiment, a tracking cookie or other suitable control can be used to determine whether the user subsequently made a purchase or engaged in other revenue-based activity from the secondary control interface. If it is determined that the user did not perform such functions, the algorithm proceeds to 324 where statistics are updated to reflect that a purchase was not made for the primary control interface and secondary control interface, otherwise the algorithm proceeds to 326 where the statistics are updated to reflect the purchase, to generate revenue sharing or tracking data or for other suitable purposes.

In operation, algorithm 300 allows traffic control to be implemented by storing data pertaining to the number of inbound and outbound click through events that occur which are associated with a meta control server and functional interface. Although algorithm 300 is shown in flow chart format, other suitable programming paradigms can also or alternatively be used to represent or implement algorithm 300, including but not limited to object oriented programming and state transition diagrams. In addition, although exemplary algorithmic functions have been shown in flow chart form, one of ordinary skill in the art will recognize that the functions described in the boxes are also algorithmic, and can be implemented in greater detail as needed in accordance with the exemplary embodiments discussed herein, such as to select meta control content based on one or more of the exemplary embodiments discussed herein or to update statistics using one or more of the exemplary embodiments discussed herein.

FIG. 4 is a diagram of an algorithm 400 for selecting secondary control interface content for a primary control interface, in accordance with an exemplary embodiment of the present disclosure. Algorithm 400 can be implemented in hardware or a suitable combination of hardware and software.

Algorithm 400 begins at 402, where content of a control interface is determined. In one exemplary embodiment, the content can be determined by scraping the control interface to extract text data, image data, hyperlinks and other suitable data, and by analyzing the text data, image data, hyperlink data or data obtained from the hyperlink address to identify one or more key words or concepts. In this exemplary embodiment, a control interface can be a blog that discusses a specific type of clothing for a specific event, where the keywords are limited to that specific type of clothing or that specific event. In another exemplary embodiment, the keywords can be expanded to other types of clothing for that specific event, or other types of events for that specific clothing. These examples are intended to be non-limiting, and other types of processes can be used to evaluate the content of the control interface. The content can be determined when the blog or other control interface is published, posted, released or otherwise completed, can be determined prior to activation of the control at 404 or can be implemented in other suitable manners. The algorithm then proceeds to 404.

At 404, a meta control of the control interface is activated. In one exemplary embodiment, the meta control can be implemented as a widget or other functional component of a blog or web page, and can cause one or more data messages to be transmitted to a meta control server. The algorithm then proceeds to 406.

At 406, the content of other control interfaces is ranked for the purpose of selecting secondary control interfaces to reference from the primary control interface. In one exemplary embodiment, the keywords for the primary control interface can be used to filter other control interfaces as a function of the keywords associated with those other control interfaces, such as by using a search algorithm to locate other relevant control interfaces. Likewise, other suitable ranking procedures can also or alternatively be used, such as image data analysis and matching, related link keyword matching (such as by accessing the related links from the other control interfaces and adding keywords associated with those related links to the analysis), or other suitable data. The algorithm then proceeds to 408.

At 408, competitors are excluded from the identified secondary control interface candidates. In one exemplary embodiment, competitors can be identified by identifying retail sales systems associated with the primary and secondary control interfaces, and excluding any secondary control interfaces that use the same retail sales systems as the primary control interface. In this exemplary embodiment, if the primary control interface features products from store A and the secondary control interface also features products from store A, such that both control interfaces generate revenue by referring sales to store A, then the secondary control interface can be excluded, but if the secondary control interface features the same type of products from store B, then the secondary control interface can be included, such as where the type of products have sufficient diversity, such as clothing. In this regard, the term "competitor" does not mean a competitor in every aspect, such as a party that sells the same type of goods or services, as long as the party does not compete with the primary control interface in at least one aspect. In addition, a black list of excluded control interfaces, a white listed of included control interfaces or other suitable processes can also or alternatively be used to select candidates for the secondary control interfaces. The algorithm then proceeds to 410.

At 410, the ranking of secondary control interfaces is adjusted as function of click through rates. As discussed above, both the primary control interface and the secondary control interfaces will have associated inbound and outbound click through rates, and based on the absolute or relative inbound and outbound click through rates, the ratios of click through rates or other suitable metrics, the rankings can be adjusted to provide optimal traffic control, so as to ensure that all control interfaces that participate in the meta control system experience the same approximate number of inbound and outbound click through rates. The algorithm then proceeds to 412.

At 412, the meta control content is selected. In one exemplary embodiment, when a secondary control interface is selected for use with the meta control, a predetermined thumbnail, video segment, text segment or other suitable data can be retrieved or selected and used to populate a thumbnail or small window section of the meta control for the primary control interface. In this manner, when a viewing user accesses the primary control interface, they will be presented with additional relevant content of potential interest in a small thumbnail or other window/feature, and can select that content to navigate to the secondary control interface to view the content. The navigation can result in a pop-up window, a new window or other suitable processes can be used. The viewing user's subsequent activities in regards to the secondary control interface can then be tracked to provide additional statistics for use in determining whether to use the secondary control interface for other meta control selections.

In operation, algorithm 400 allows data for one or more secondary control interfaces to be selected for display on a primary control interface, based on the relevance of the secondary control interface content and traffic load balancing. Although algorithm 400 is shown in flow chart format, other suitable programming paradigms can also or alternatively be used to represent or implement algorithm 400, including but not limited to object oriented programming and state transition diagrams. In addition, although exemplary algorithmic functions have been shown in flow chart form, one of ordinary skill in the art will recognize that the functions described in the boxes are also algorithmic, and can be implemented in greater detail as needed in accordance with the exemplary embodiments discussed herein, such as to select meta control content based on one or more of the exemplary embodiments discussed herein or to update statistics using one or more of the exemplary embodiments discussed herein.

Control interface 102 and meta control server 106 of system 100 and associated algorithms 300 and 400 are special purpose processing systems. The meta control server 106 is configured to receive content requests from control interface 102 and provide additional web based content in response. The special purpose system operates to select web based content from other interface providers and filter the content based on the publisher, or other information that can be used to determine whether the other interface provider is a competing entity, and further operates to filter the content based on at least one of relevance of the content, inbound clicks, and outbound clicks and the preference or requirements of the control interface 102 or other control interfaces 104A-104N. The special purpose processing system performs these functions using the specific control data input and output processing functionality as described in the algorithms presented herein. The control functionality of control interface 102 and meta control server 106 is an innovative way in which to manage the integration of web based data from at least one other secondary service provider into the web site of a primary service provider. A technical advantage of such a special purpose system is that web traffic can be analyzed in real-time from the primary source and relevant and/or traffic enhancing web based data determined and filtered of non-competing web-based data and provided to the primary source. This is a significant advantage over traditional systems wherein $3^{rd}$ party linkable content within a web site lack the control and management capabilities as that of the present system.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A computer-implemented method for secondary application content integration, the method comprising:

for a primary application having primary content associated with a publisher user, identifying a plurality of secondary applications associated with the publisher user;

determining secondary content of a secondary application, from the plurality of secondary applications, for integration into the primary application based on a similarity or relevancy of the secondary content to the primary content;

inserting the secondary content into the primary application such that at least a portion of the secondary content is included within a user interface of the primary application for display, and the secondary application is navigated to in response to a selection associated with at least the portion of the secondary content displayed via the user interface; and causing the user interface of the primary application that includes the primary content and at least the portion of the secondary content to be displayed on a computing device associated with one or more of the publisher user or a viewing user.

2. The computer-implemented method of claim 1, wherein determining the secondary content of the secondary application for integration into the primary application further comprises:

determining the secondary content of the secondary application further based on traffic statistics of the secondary application relative to traffic statistics of the primary application.

3. The computer-implemented method of claim 2, wherein determining the secondary content of the secondary application further based on the traffic statistics of the secondary application relative to the traffic statistics of the primary application comprises:

receiving one or more of a first inbound click through rate or a first outbound click through rate for the primary application;

receiving one or more of a second inbound click through rate or a second outbound click through rate for the secondary application; and determining integration of the secondary content of the secondary application into the primary application provides optimal traffic based on a comparing of the one or more of the first inbound click through rate or the first outbound click through rate for the primary application to the one or more of the second inbound click through rate or the second outbound click through rate for the secondary application.

4. The computer-implemented method of claim 1, wherein determining the secondary content of the secondary application, from the plurality of secondary applications, for integration into the primary application based on the similarity or relevancy of the secondary content to the primary content comprises:

scraping the primary application to extract one or more of text data or image data comprising the primary content;

analyzing the one or more of the text data or the image data extracted from the primary content;

ranking respective content of the plurality of secondary applications based on a relevancy or similarity of the respective content of the plurality of secondary applications to the one or more of text data or image data analyzed; and determining the secondary content of the secondary application for integration into the primary application based on the ranking.

5. The computer-implemented method of claim 4, wherein the one or more of the text data or the image data extracted from the primary content is associated with a product.

6. The computer-implemented method of claim 4, further comprising:

performing one or more of keyword matching or image data matching based on the one or more of the text data or the image data analyzed to determine the relevancy or similarity of the respective content of the plurality of secondary applications.

7. The computer-implemented method of claim 4, further comprising:

prior to the ranking, excluding any of the plurality of secondary applications determined to be a competitor application of the primary application or having respective content determined to be competing content to the primary content.

8. The computer-implemented method of claim 4, further comprising:

adjusting the ranking based on traffic statistics of the plurality of secondary applications relative to traffic statistics of the primary application.

9. The computer-implemented method of claim 1, wherein only a portion of the secondary content is displayed within the user interface, and the method further comprises:

determining the portion of the secondary content to be displayed within the user interface based on a similarity or a relevancy of the portion of the secondary content to the primary content.

10. The computer-implemented method of claim 9, wherein determining the portion of the secondary content to be displayed within the user interface based on the similarity or the relevancy of the portion of the secondary content to the primary content comprises:

identifying one or more of first text data or first image data from the primary content;

identifying one or more of second text data or second image data from the secondary content of the secondary application; and determining a portion of the one or more of second text data or second image data most similar or most relevant to the one or more of first text data or first image data as the portion of the secondary content of the secondary application to be displayed within the user interface.

11. The computer-implemented method of claim 1, wherein inserting the secondary content into the primary application comprises:

generating a user interface section including at least the portion of the secondary content; and causing the user interface section to be positioned at a particular location within the user interface of the primary application for display.

12. The computer-implemented method of claim 11, wherein the user interface section is one of a thumbnail, an image or video segment, a text segment, or a window.

13. The computer-implemented method of claim 1, wherein inserting the secondary content into the primary application comprises:

inserting at least the portion of the secondary content into data of the user interface of the primary application based on one or more of markup language, a template, or a location of one or more tags.

14. A system for secondary application content integration, the system comprising:

one or more processors; and at least one memory storing instructions that, when executed by the one or more processors, cause the one or more processors to perform operations, the operations comprising:

for a primary application having primary content associated with a publisher user, identifying a plurality of secondary applications associated with the publisher user;

determining secondary content of a secondary application, from the plurality of secondary applications, for integration into the primary application based on a similarity or relevancy of the secondary content to the primary content;

inserting the secondary content into the primary application such that at least a portion of the secondary content is included within a user interface of the primary application for display, and the secondary application is navigated to in response to a selection associated with at least the portion of the secondary content displayed via the user interface; and causing the user interface of the primary application that includes the primary content and at least the portion of the secondary content to be displayed on a computing device associated with one or more of the publisher user or a viewing user.

15. The system of claim 14, wherein determining the secondary content of the secondary application for integration into the primary application further comprises:

determining the secondary content of the secondary application further based on traffic statistics of the secondary application relative to traffic statistics of the primary application.

16. The system of claim 14, wherein determining the secondary content of the secondary application, from the plurality of secondary applications, for integration into the primary application based on the similarity or relevancy of the secondary content to the primary content comprises:

scraping the primary application to extract one or more of text data or image data comprising the primary content;

analyzing the one or more of the text data or the image data extracted from the primary content;

ranking respective content of the plurality of secondary applications based on a relevancy or similarity of the respective content of the plurality of secondary applications to the one or more of text data or image data analyzed; and determining the secondary content of the secondary application for integration into the primary application based on the ranking.

17. The system of claim 16, wherein the operations further comprise one or more of:

prior to the ranking, excluding any of the plurality of
secondary applications determined to be a competitor
application of the primary application or having respec-
tive content determined to be competing content to the
primary content; or adjusting the ranking based on traffic statistics of the
plurality of secondary applications relative to traffic
statistics of the primary application.

18. The system of claim 14, wherein only a portion of the
secondary content is displayed within the user interface, and
the operations further comprise:

determining the portion of the secondary content to be
displayed within the user interface based on a similarity
or a relevancy of the portion of the secondary content
to the primary content.

19. The system of claim 14, wherein inserting the sec-
ondary content into the primary application comprises one
of:

generating a user interface section including at least the
portion of the secondary content, the user interface
section caused to be positioned at a particular location
within the user interface of the primary application for
display; or inserting at least the portion of the secondary content into
data of the user interface of the primary application
based on one or more of markup language, a template,
or a location of one or more tags.

20. A non-transitory computer readable medium for sec-
ond application content integration, the non-transitory com-
puter readable medium storing instructions which, when
executed by one or more processors, cause the one or more
processors to perform operations comprising:

for a primary application having primary content associ-
ated with a publisher user, identifying a plurality of
secondary applications associated with the publisher
user;

determining secondary content of a secondary applica-
tion, from the plurality of secondary applications, for
integration into the primary application based on a
similarity or relevancy of the secondary content to the
primary content;

inserting the secondary content into the primary applica-
tion such that at least a portion of the secondary content
is included within a user interface of the primary
application for display, and the secondary application is
navigated to in response to a selection associated with
at least the portion of the secondary content displayed
via the user interface; and causing the user interface of the primary application that
includes the primary content and at least the portion of
the secondary content to be displayed on a computing
device associated with one or more of the publisher
user or a viewing user.

\* \* \* \* \*